United States Patent
Majonen

(10) Patent No.: US 8,014,727 B2
(45) Date of Patent: Sep. 6, 2011

(54) SIGNAL PROCESSING IN ELECTRONIC APPARATUS

(75) Inventor: Kari Majonen, Haukipudas (FI)

(73) Assignee: Nokia Corporation, Espoo (FI)

(*) Notice: Subject to any disclaimer, the term of this patent is extended or adjusted under 35 U.S.C. 154(b) by 706 days.

(21) Appl. No.: 12/078,924

(22) Filed: Apr. 8, 2008

(65) Prior Publication Data

US 2009/0215399 A1     Aug. 27, 2009

(30) Foreign Application Priority Data

Feb. 22, 2008   (FI) ..................................... 20085161

(51) Int. Cl.
   *H04B 17/00*     (2006.01)
(52) U.S. Cl. ...................... 455/67.11; 455/513; 375/224
(58) Field of Classification Search ................... 455/513, 455/67.11, 447, 562.1; 370/380, 329, 345, 370/208; 375/260, 267, 367, 345, 224
   See application file for complete search history.

(56) References Cited

U.S. PATENT DOCUMENTS

| | | | | |
|---|---|---|---|---|
| 7,447,276 | B1* | 11/2008 | Beadle | 375/316 |
| 2006/0109897 | A1* | 5/2006 | Guo et al. | 375/232 |
| 2007/0183380 | A1 | 8/2007 | Rensburg et al. | |
| 2007/0258538 | A1* | 11/2007 | Wight | 375/267 |
| 2008/0273490 | A1* | 11/2008 | Sayana et al. | 370/329 |

OTHER PUBLICATIONS

Lee et al., "Low-Rank Pilot-Symbol-Aided Channel Estimation for MIMO-OFDM System," *2004 IEEE 60th Vehicular Technology Conference*, VTC2004-Fall—Sep. 26-29, 2004, Los Angeles, CA, USA, IEEE, vol. 1, Sep. 26, 2004.
Detert et al., "Joint MSE Channel Estimation within the Current GSM/EDGE Standard," *2004 IEEE 60th Vehicular Technology Conference*, VTC2004-Fall—Sep. 26-29, 2004, Los Angeles, CA, USA, IEEE, vol. 5, Sep. 26, 2004.
Search Report and Written Opinion for PCT/IB2009/000326 dated Nov. 24, 2009.
Pelin, et al., "A Bootstrap Technique for Rank Estimation", 2000 IEEE; Australian Telecommunications Research Institute (ATRI), Curtin University of Technology, GPO Box U 1987, Perth, WA 6845, Australia.
Zu, et al., "A Robust Bank Estimation Algorithm of Group-Blind MMSE Multiuser Detectors for CDMA Systems", IEEE Transactions on Communications, vol. 51, No. 4, Apr. 2003.

* cited by examiner

*Primary Examiner* — Edward Urban
*Assistant Examiner* — Golam Sorowar
(74) *Attorney, Agent, or Firm* — Alston & Bird LLP

(57) ABSTRACT

A method, apparatus, and computer program for estimating a rank, i.e. the number of uncorrelated spatial channels, of a radio channel are provided. The rank estimation is carried out by examining mutual proportions of a first eigenvalue and a second eigenvalue of a two-by-two channel matrix representation with a test function including elements of a solution of roots of a quadratic characteristic equation of the two-by-two channel matrix representation, wherein the test function comprises a discriminant of the solution of the roots of the quadratic characteristic equation without a square root operation.

21 Claims, 1 Drawing Sheet

SIGNAL PROCESSING IN ELECTRONIC APPARATUS

FIELD

Figure 1:
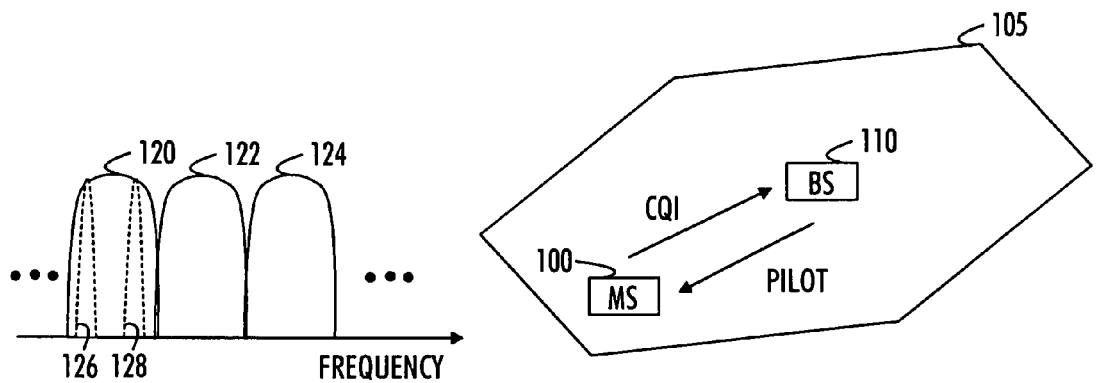

The invention relates to the field of signal processing and, particularly, to calculation of a matrix rank in a signal processing device.

BACKGROUND

In modern mobile telecommunication systems employing high data rate communication schemes, communication resources are dynamically allocated, or scheduled, to mobile stations on the basis of channel qualities and interference conditions experienced by the mobile stations. A given mobile station estimates the quality of given transmission resources, such as frequency sub-bands, and transmits the quality of the transmission resources to a serving base station for scheduling.

Additionally, it is anticipated that mobile telecommunication stations will support multiple spatially parallel transmission streams between the base station and the mobile station, wherein independent data is transmitted in the parallel transmission streams in order to provide higher data rates. For such a purpose, the mobile stations are equipped with a plurality of antennas.

For efficient utilization of available communication resources, mobile stations may also determine the number of independent (or sufficiently uncorrelated), spatially parallel communication streams and transmit also this information to the base station. The mobile station may calculate the quality of a given transmission resource and the number of independent spatially parallel communication streams in that transmission resource from a pilot signal transmitted on the transmission resource. The mobile station may calculate from the received pilot signal a channel matrix representation representing properties of a radio channel between antenna arrays of the base station and the mobile station. In more detail, the channel matrix representation may be calculated from a channel response matrix including elements indicating the response of the radio channel between any two transmitter-receiver-antenna pair. The number of independent spatially parallel communication streams is determined by calculating a rank of the channel matrix representation. In theory, the rank of a matrix is defined as the number of non-zero eigenvalues of the matrix. In this context, however, a rank is defined as the number of eigenvalues of the matrix differing sufficiently from zero. The number of the independent, spatially parallel communication streams is proportional to the number of eigenvalues of the matrix differing sufficiently from zero. The sufficient difference may be determined with a threshold.

The calculation of the rank is, however, a computationally complex procedure. Iterative methods have been proposed for calculating the rank, but the expected complexity of these methods is unknown beforehand and, thus, they are not ideal for use in mobile stations with limited computational resources. Another solution for calculating the rank is through solving roots of a characteristic equation of the matrix. However, this includes calculation of a square root which is a complex operation from a implementational point of view. Accordingly, a need exists for reducing computational complexity of the rank estimation procedure.

BRIEF DESCRIPTION

According to an aspect of the present invention, there is provided a method as specified in claim 1.

According to another aspect of the present invention, there is provided an apparatus as specified in claim 8.

According to another aspect of the present invention, there is provided an apparatus as specified in claim 16.

According to yet another aspect of the present invention, there is provided a computer program product embodied on a computer readable distribution medium as specified in claim 19.

Embodiments of the invention are defined in the dependent claims.

LIST OF DRAWINGS

Figure 2:
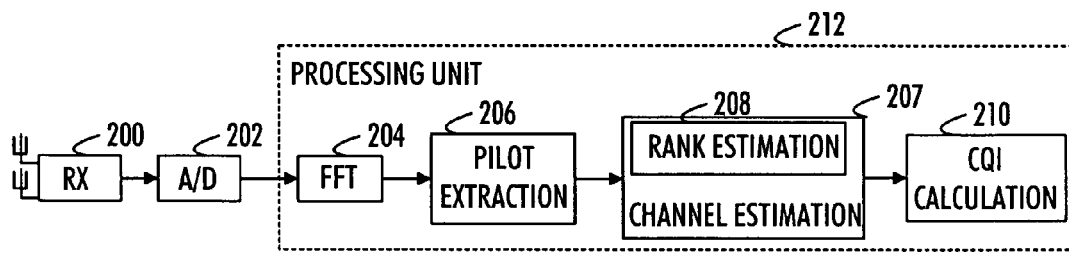
Figure 3:
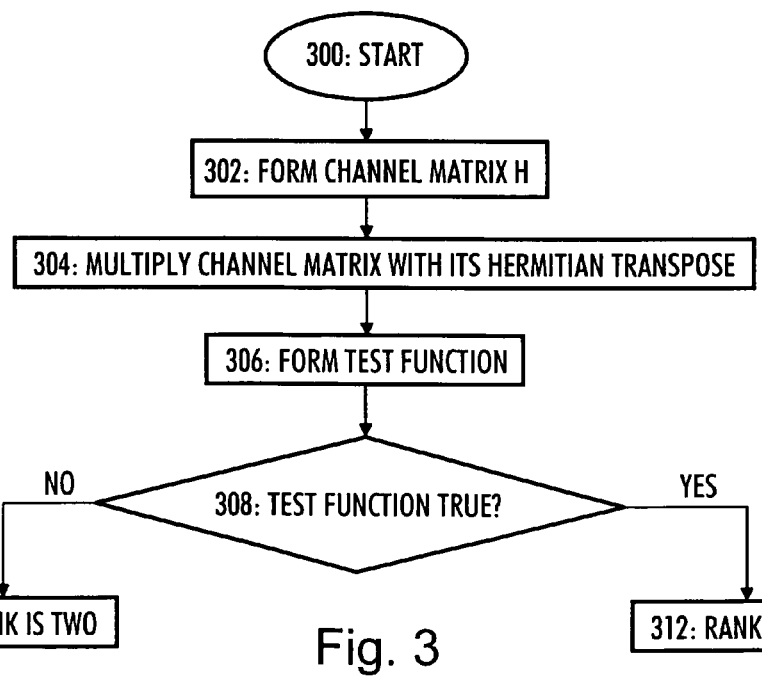

Embodiments of the present invention are described below, by way of example only, with reference to the accompanying drawings, in which FIG. 1 illustrates communication between a mobile station and a base station serving the mobile station;

FIG. 2 illustrates an example of a structure of a radio receiver, to which embodiments of the invention may be applied; and FIG. 3 is a flow diagram describing a process for determining the number of available spatial communication streams between a transmitter and a receiver.

DESCRIPTION OF EMBODIMENTS

The following embodiments are exemplary. Although the specification may refer to "an", "one", or "some" embodiment(s) in several locations, this does not necessarily mean that each such reference is made to the same embodiment(s), or that the feature only applies to a single embodiment. Single features of different embodiments may also be combined to provide other embodiments.

FIG. 1 illustrates communication between a mobile station (MS) 100 located within a cell 105 and being served by a base station (BS) 110 associated with the cell 105 in a mobile telecommunication system to which embodiments of the invention may be applied. The mobile telecommunication system may be a cellular telecommunication system, such as a long-term evolution (LTE) of Universal Mobile Telecommunication System (UMTS), International Mobile Telecommunications (IMT), or Worldwide Interoperability for Microwave Access (WiMAX), for example. Downlink communications in the system may be based on an orthogonal frequency division multiple access (OFDMA) scheme in which a plurality of transmission resource blocks 120, 122, 124 is scheduled dynamically to the mobile station 100 and other mobile stations under the control of the base station 110. The transmission resource blocks 120, 122, 124 may also be defined as frequency resource blocks, wherein each resource block 120, 122, 124 comprises a predetermined and fixed number of subcarriers. Let us remind that OFDMA is known as a multicarrier transmission scheme in which a multicarrier transmission signal comprises a plurality of subcarriers separated in a frequency domain.

Pilot symbols 126, 128 may be transmitted in the resource blocks 120, 122, 124 according to a pattern known to both the base station 110 and the mobile station 100. The mobile station may estimate the quality of a given resource block 120 from the pilot symbols 126, 128 transmitted in the resource block 120. Then, the mobile station may include the estimated quality of the resource block 120 in a channel quality indicator (CQI) and transmit the CQI to the base station 110 for use in scheduling of the resource blocks. The mobile station 100 may estimate the quality in a similar manner for a number of resource blocks, wherein the number of resource blocks for which the mobile station 100 is configured to estimate the CQI may be dependent on the total bandwidth in the cell 105, for example.

As mentioned above, the base station 110 may perform the resource block scheduling for the mobile station on the basis of the CQIs received from the mobile station such that a resource block is most probably scheduled to a mobile station indicating high quality for the resource block.

The CQI transmitted by the mobile station 100 may also include a modulation and coding scheme proposed by the mobile station for each resource block included in the CQI. The mobile station 100 may calculate the modulation and coding scheme according to the estimated quality of the resource block by mapping the quality to a predetermined modulation and coding scheme. In this context, the coding scheme refers to the strength of channel coding.

As mentioned in the background section, the mobile station 100 may also determine the number of independent (or sufficiently uncorrelated), spatially parallel communication streams and include also this information in the CQI transmitted to the base station. To enable this type of transmission scheme known as multiple-input-multiple-output (MIMO) communications, both the base station 110 and the mobile station 100 are equipped with an antenna array comprising a plurality of antennas. The antenna array of the base station 110 typically comprises at least four antennas, but the number of antennas in the mobile station 100 is typically limited to two because of the small size of the mobile station 100. The antenna separation should be high enough (at least half of the wavelength of the communication signals), and the physical size of the mobile station 100 is typically a limiting factor.

Accordingly, the mobile station 100 may first estimate a channel response matrix describing the impulse response of a radio channel between the mobile station 100 and the base station 110. In more detail, the channel response matrix may define the channel response between each transmit and reception antenna pair. For example, if the base station 110 includes four antennas and the mobile station 100 includes two antennas, the channel matrix calculated in the mobile station becomes a two-by-four channel response matrix. The channel response matrix is typically estimated from the received pilot symbols. Then, the mobile station 100 estimates the rank of the channel response matrix in order to determine the number of available, spatially parallel communication streams. The determination of the number of available, spatially parallel communication streams may be estimated for the entire available bandwidth by first calculating the rank (or a rank metric describing the rank) for each resource block and then averaging the calculated ranks or rank metrics. Additionally, time-domain averaging may be performed to remove short-term variations from the rank estimate. When the mobile station has determined the number of available, spatially parallel communication streams, the mobile station may calculate pre-coding weights for the communication streams for use in the base station to weight the transmission signals appropriately. Then, the mobile station may include the information on the number of available parallel transmission streams and the calculated pre-coding weights in the CQI.

FIG. 2 illustrates a block diagram of a radio receiver configured to perform the rank estimation in order to determine the number of available, spatially parallel communication streams. In this example, let us consider the radio receiver as the mobile station 100. The mobile station 100 comprises analog reception components 200 configured to process a received orthogonal frequency division multiplexing (OFDM) radio signal into a baseband signal and apply the baseband OFDM signal to an analog-to-digital (A/D) converter 202. The A/D converter 202 converts the analog baseband signal into a digital form. Since the received OFDM signal comprises subcarriers separated in the frequency domain, it is often preferable to process the OFDM signal in the frequency domain. The digitized OFDM signal is converted into the frequency domain with a fast Fourier transform (FFT) in an FFT unit 204. Then, the frequency domain OFDM signal is applied to a pilot extraction unit 206. The pilot extraction unit 206 extracts pilot symbols from the other data and control symbols, and applies the pilot symbols to a channel estimation unit 207 which may include a rank estimation unit 208. The channel estimation unit 207 may form a channel response matrix describing the response of the radio channel from the extracted pilot symbols, and the rank estimation unit 208 may perform a rank estimation procedure on the channel response matrix. The rank estimation unit 208 may determine the number of sufficiently uncorrelated, spatially parallel communication streams in a rank estimation procedure to be described in more detail below. The number of sufficiently uncorrelated, spatially parallel communication streams is then applied to a CQI calculation unit 210 configured to calculate a CQI by taking into account not only the information received from the rank estimation unit 208 but also other information related to the CQI, as described above.

Let us now consider the rank estimation procedure first from a theoretical point of view and then from an implementational point of view according to an embodiment of the invention. Let us start by defining a pilot signal received on a given subcarrier as:

$$r = \begin{pmatrix} r_1 \\ r_2 \end{pmatrix} = \begin{pmatrix} h_{11} & h_{12} \\ h_{21} & h_{22} \end{pmatrix} \begin{pmatrix} b_1 \\ b_2 \end{pmatrix} + \begin{pmatrix} n_1 \\ n_2 \end{pmatrix} = Hb + n, \qquad (1)$$

where r1 and r2 represent pilot symbols received through different (two) antenna elements of the mobile station, b1 and b2 denote transmitted pilot symbols, and n1 and n2 denote noise components received through different antenna elements of the mobile station. In this example, it is assumed that the base station also includes two antenna elements and, thus, channel response matrix H becomes a two-by-two channel matrix including elements h11, h12, h21, and h22, wherein h11 denotes the channel response between a first antenna element of the base station and a first antenna element of the mobile station, h12 denotes the channel response between a second antenna element of the base station and a first antenna element of the mobile station, etc. For the sake of clarity, a two-by-two matrix is a matrix with two rows and two columns. The channel response matrix H is of particular interest in determining the number of available spatially uncorrelated communication streams, i.e. a channel rank. In communication theory, the channel rank may be calculated as the number of non-zero eigenvalues of matrix R=HSH, where S denotes Hermitian transpose operation, i.e. HS denotes complex conjugate transpose of matrix H. In this description, a matrix R, from which the rank is actually estimated, is referred to as a channel matrix representation, which describes properties of the radio channel between the base station and the mobile station. In this example, the channel matrix representation R is naturally a two-by-two matrix as well but it is also a correlation matrix of the channel matrix. As will be described below, the two-by-two channel matrix representation R may be obtained in a different manner, according to the dimensions of the channel response matrix H.

A computationally attractive method for calculating eigenvalues of a small two-by-two matrix is calculating roots of its characteristic equation. In this example, the characteristic equation of the channel matrix representation R is defined as:

$$|R - \lambda I| = 0, \quad (2)$$

where $\lambda$ denotes an eigenvalue, I represents an identity matrix, and |•| denotes a determinant of the matrix. Solving equation (2) yields:

$$\begin{vmatrix} r_{11} - \lambda & r_{12} \\ r_{21} & r_{22} - \lambda \end{vmatrix} = (r_{11} - \lambda)(r_{22} - \lambda) - r_{21}r_{12} \quad (3)$$
$$= \lambda^2 - (r_{11} + r_{22})\lambda + r_{11}r_{22} - r_{21}r_{12}$$

Roots of this quadratic equation may be calculated according to a well known quadratic formula $$\lambda_{1,2} = \frac{r_{11} + r_{22} \pm \sqrt{(r_{11} + r_{22})^2 - 4(r_{11}r_{22} - r_{21}r_{12})}}{2} \quad (4)$$
$$= \frac{r_{11} + r_{22} \pm \sqrt{(r_{11} - r_{22})^2 - 4(r_{21}r_{12})}}{2}$$

Equivalently, equation (4) may be defined with the elements of the channel matrix H as:

$$\lambda_{1,2} = \frac{|h_{11}|^2 + |h_{12}|^2 + |h_{21}|^2 + |h_{22}|^2 \pm \sqrt{\begin{array}{c}(|h_{11}|^2 + |h_{12}|^2 + |h_{21}|^2 + |h_{22}|^2)^2 + \\ 4|h_{11}^* h_{12} + h_{21}^* h_{22}|^2\end{array}}}{2} \quad (5)$$

From an implementational point of view, the square root operation in calculation of the roots $\lambda 1$ and $\lambda 2$ provides the most serious challenge, because calculation of the square root operation is a very complex task in practical implementations. The invention aims to reduce the complexity of the rank estimation by avoiding the need for the complex calculation of the square root operation. As mentioned above, the rank of the channel matrix is the number of non-zero eigenvalues. In practical implementations, estimation noise is always present and, thus, rank estimation never produces zero-valued eigenvalues. In other words, determining the number of non-zero eigenvalues is useless, because the number of non-zero eigenvalues is always equal to the number of eigenvalues even in the case of severely correlated spatial communication streams. In order to determine the practical rank of the channel matrix H, that is the number of available spatial communication streams, the proportions of the eigenvalues are of interest. The proportions of the eigenvalues may be compared with each other in order to determine their mutual proportions. It is assumed that the rank of the channel matrix is always at least one, i.e. at least one eigenvalue differs from zero significantly. If the two-by-two channel matrix representation R has two eigenvalues, the mutual proportions of the two eigenvalues may be compared with each other, and the practical rank of the channel may be determined on the basis of the comparison. If the two eigenvalues are sufficiently close to each other, the number of available spatial communication streams may be determined to be two, and if the two eigenvalues differ from each other sufficiently, the number of available spatial communication streams may be determined to be one.

The mutual proportions, e.g. the eigenvalue ratio, may be defined as $\lambda 1/\lambda 2$. For simplicity of notation, let us first define $$a = r_{11} + r_{22} = |h_{11}|^2 + |h_{12}|^2 + |h_{21}|^2 + |h_{22}|^2 \quad (6)$$
$$b = (r_{11} - r_{22})^2 - 4(r_{21}r_{12})$$
$$= (|h_{11}|^2 - |h_{12}|^2 + |h_{21}|^2 - |h_{22}|^2)^2 + 4|h_{11}^* h_{12} + h_{21}^* h_{22}|^2$$

In other words, 'a' denotes the sum of diagonal elements of the channel matrix representation R and/or the sum of squared absolute values of the elements of the channel response matrix H, and b denotes a discriminant in a solution of the roots of the quadrature characteristic equation of the channel matrix representation R. Now, the eigenvalue $\lambda 1$, $\lambda 2$ ratio may be defined as:

$$\frac{\lambda_1}{\lambda_2} = \frac{a + \sqrt{b}}{a - \sqrt{b}} \quad (7)$$

It has been discovered that the ratio on the right hand side of equation (7) may be approximated quite accurately as defined below:

$$\frac{\lambda_1}{\lambda_2} = \frac{a + \sqrt{b}}{a - \sqrt{b}} \approx 2 \times \left(\frac{a^2 + b}{a^2 - b}\right) \quad (8)$$

From the approximation of equation (8), a test function may be derived for determining the number of available spatially parallel communication streams, and the test function may be based on comparing the first eigenvalue and the second eigenvalue ratio with a predetermined threshold value TH as:

$$\frac{a^2 + b}{a^2 - b} > TH \quad (9)$$

In equation (9), multiplication by two in equation (8) is taken into account in the threshold value TH beforehand. Accordingly, it may be determined that the number of available spatially parallel communication streams is two, if the test function is false, and that the number of available spatially parallel communication streams is one, if the test function is true. This test function does, however, include a division which is also quite a complex calculation task in practical implementations. Furthermore, there is a possibility of division by zero in fixed-point implementations in which small values of a2−b may be rounded to zero. Since the correlation matrix is inherently positively semi-definite due to the fact that it is obtained by multiplying the channel response matrix H by its Hermitian transpose HS, equation (9) may be modified as:

$$a^2 + b > TH(a^2 - b) \quad (10)$$

Now, the complex division operation and the risk of divisions by zero are avoided. Referring to the test function of equation (10), the left hand side of the equation (a2+b) may be interpreted to represent an estimate of the first eigenvalue, while a2−b may be interpreted to represent an estimate of the second eigenvalue. Accordingly, the square root operation from the discriminant, i.e. square root of b, in the solution of the roots of the quadratic characteristic equation is replaced by the discriminant b itself without the square root operation, thereby avoiding the need to calculate the complex square root operation and reducing the complexity of the channel estimation unit 207, rank estimation unit 208, and processing unit 212.

Let us now describe the rank estimation procedure according to an embodiment of the invention with reference to FIG. 3. The procedure may be carried out in the processing unit 212 of the radio receiver and, particularly, in the channel estimation unit 207. The procedure starts in block 300.

In block 302, the channel response matrix H is estimated from pilot symbols received from the transmitter. As mentioned above, the channel response matrix H describes the (impulse) response of the radio channel between all transmitter and receiver antenna pairs. In block 304, the channel matrix representation is calculated by multiplying the channel response matrix with its Hermitian transpose appropriately to obtain channel matrix representation as a two-by-two matrix. It is known from matrix theory that Rank(H)=Rank(HHS)=Rank(HSH)=Rank(R). Accordingly, as long as either transmitter or the receiver comprises two antennas, the channel matrix H may be modified into the two-by-two channel matrix representation R by multiplying the channel matrix appropriately in order to apply the rank estimation for the two-by-two matrix according to embodiments of the invention. For example, if the channel matrix H is a four-by-two matrix (four rows and two columns) representing a case where the receiver has four antennas and the transmitter has two antennas, the two-by-two channel matrix representation R is obtained by calculating HSH. If the channel matrix H is a two-by-three matrix (two rows and three columns) representing a case where the receiver has two antennas and the transmitter has three antennas, the two-by-two channel matrix representation R is obtained by calculating HHS.

Then, a test function is calculated in block 306. In practice, values of 'a' and 'b' are first calculated. 'a' may be calculated by summing the main diagonal elements r11 and r22 of the two-by-two channel matrix representation R, and 'b' may be calculated as b=(r11-r22)2+4×|r12|2. Alternatively, 'a' and 'b' may be derived directly from the elements of the channel response matrix H. For example, if the channel response matrix H is a two-by-four matrix, the elements of the two-by-two channel matrix representation become $$r_{11} = |h_{11}|^2 + |h_{12}|^2 + |h_{13}|^2 + |h_{14}|^2$$
$$r_{12} = r_{21}^* = h_{11}h_{21}^* + h_{12}h_{22}^* + h_{13}h_{23}^* + h_{14}h_{24}^*$$
$$r_{22} = |h_{21}|^2 + |h_{22}|^2 + |h_{23}|^2 + |h_{24}|^2$$

(11)

After calculating 'a' and 'b', the actual test function defined by equation (10) is formed. In practice, 'a2+b' and 'a2−b' are calculated first and the threshold value TH is obtained from a memory unit storing the threshold value TH. The threshold value TH may have been stored in the memory unit beforehand and it may be kept fixed. In block 308, it is determined whether the test function of equation (10) is true. If the test function is determined to be true, i.e. 'a2+b' is still higher than 'a2−b' multiplied by the threshold value TH, the process moves to block 312 where it is determined that the two eigenvalues of the channel response matrix H are not sufficiently close to each other and that the practical rank of the channel response matrix H is one. In other words, it is determined that the number of spatially sufficiently uncorrelated communication streams between the transmitter and the receiver is one. On the other hand, if the test function is determined to be false, i.e. 'a2+b' is not higher than 'a2−b' multiplied by the threshold value TH, the process moves to block 310 where it is determined that the two eigenvalues of the channel response matrix H are sufficiently close to each other and that the practical rank of the channel response matrix H is one. In other words, it is determined that the number of spatially sufficiently uncorrelated communication streams between the transmitter and receiver is two.

As mentioned above, the process described in FIG. 3 may be carried out in the processing unit (or processor) of the radio receiver. The processing unit may be configured to operate in the mobile station of the mobile telecommunication system described above. The processing unit may be considered as an example of means for calculating the channel matrix representation, means for examining the proportions of the eigenvalues, and means for determining the number of available parallel spatial communication streams. The processing unit may include an interface to receive the channel response matrix H or pilot symbols from which the processing unit calculates the number of available spatially parallel communication streams. In this context, the interface of the processing unit may be a physical interface, such as a port or a bus of the processing unit, or an interface between two different computer programs. The number of available spatial communication streams may be averaged over the frequency resource blocks such that the radio receiver obtains a single value for the number of available spatial communication streams which represents the whole bandwidth for which the CQI is calculated. The processing unit may also average the number of available spatial communication streams over time with a determined averaging window in order to remove temporary variations from the estimate. The time-domain averaging window may be up to 30 ms, for example. Upon determining the number of available spatial communication streams, the processing unit may include the determined number of available spatial communication streams in the CQI to be transmitted to the radio transmitter, e.g. the base station, and transmit the CQI.

The process or method described in FIG. 3 may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to cellular or mobile telecommunication systems defined above but also to other suitable telecommunication systems. The protocols used, the specifications of mobile telecommunication systems, their network elements and subscriber terminals, develop rapidly. Such development may require extra changes to the described embodiments. Therefore, all words and expressions should be interpreted broadly and they are intended to illustrate, not to restrict, the embodiment.

It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
   calculating a two-by-two channel matrix representation representing properties of a radio channel between a transmission antenna array of a radio transmitter and a reception antenna array of a radio receiver;
   examining mutual proportions of a first eigenvalue and a second eigenvalue of the channel matrix representation with a test function including elements of a solution of roots of a quadratic characteristic equation of the two-by-two channel matrix representation, wherein the test function comprises a discriminant of the solution of the roots of the quadratic characteristic equation without a square root operation; and
   determining the number of available spatially parallel communication streams between the transmission antenna array and reception antenna array from the mutual proportions of the eigenvalues.

2. The method of claim 1, further comprising:
   determining the number of available spatially parallel communication streams between the transmission antenna array and reception antenna array in a processor of the radio receiver; and
   causing the determined number of available spatially parallel communication streams to be transmitted to the radio transmitter for radio resource allocation.

3. The method of claim 1, further comprising:
   forming the two-by-two channel matrix representation from a channel response matrix by multiplying the channel response matrix with a complex conjugate transpose of the channel response matrix appropriately, when the channel response matrix describing a response of the radio channel between each transmit antenna and each reception antenna has non-equal number of rows and columns, and wherein either number of rows or number of columns is two.

4. The method of claim 1, further comprising:
   examining the ratio of the first eigenvalue to the second eigenvalue of the channel matrix representation with the test function by comparing an estimate of the first eigenvalue with an estimate of the second eigenvalue multiplied by a predetermined threshold value; and
   determining the number of available spatially parallel communication streams from the result of the comparison.

5. The method of claim 4, wherein the test function is represented as: a2+b >TH(a2−b), wherein 'a2+b' represents an approximation of the estimate of the first eigenvalue, a2−b' represents an approximation of the estimate of the second eigenvalue, and 'TH' represents the threshold value, the determination further comprising:
   determining the number of available spatially parallel communication streams to be two, if the test function is false; and
   determining the number of available spatially parallel communication streams to be one, if the test function is true.

6. The method of claim 5, wherein 'a' comprises a sum of squared magnitudes of each element of the channel matrix, when the channel matrix is a two-by-two matrix, and 'b' comprises the discriminant of the second-degree characteristic equation of the two-by-two channel matrix representation.

7. The method of claim 1, further comprising:
   determining, in the radio receiver, the number of available spatially parallel communication streams between the transmission antenna array and the reception antenna array as an average for a determined number of parallel frequency resource blocks; and
   causing the determined number of available spatially parallel communication streams to be transmitted to the radio transmitter.

8. An apparatus comprising at least one processor and at least one memory including computer program code, the at least one memory and the computer program code configured to, with the at least one processor, cause the apparatus at least to:
   receive information representing properties of a radio channel between a transmission antenna array of a radio transmitter and a reception antenna array of a radio receiver;
   calculate, from the information received, a two-by-two channel matrix representation representing properties of the radio channel;
   examine mutual proportions of a first eigenvalue and a second eigenvalue of the channel matrix representation with a test function including elements of a solution of roots of a quadratic characteristic equation of the two-by-two channel matrix representation, wherein the test function comprises a discriminant of the solution of the roots of the quadratic characteristic equation without a square root operation; and
   determine the number of available spatially parallel communication streams between the transmission antenna array and the reception antenna array from the mutual proportions of the eigenvalues.

9. The apparatus of claim 8, wherein the apparatus is further caused to be used in the radio receiver and to cause the determined number of available spatially parallel communication streams to be transmitted to the radio transmitter for radio resource allocation.

10. The apparatus of claim 8, wherein the apparatus is further caused to form the two-by-two channel matrix representation from a channel response matrix describing response of the radio channel between each transmit antenna and each reception antenna, by multiplying the channel response matrix with a complex conjugate transpose of the channel response matrix appropriately, if the channel response matrix has a non-equal number of rows and columns, wherein either the number of rows or the number of columns is two.

11. The apparatus of claim 8, wherein the apparatus is further caused to:
    examine the ratio of the first eigenvalue to the second eigenvalue of the channel matrix representation with the test function by comparing an estimate of the first eigenvalue with an estimate of the second eigenvalue multiplied by a predetermined threshold value; and
    determine the number of available spatially parallel communication streams from a result of the comparison.

12. The apparatus of claim 11, wherein the test function is represented as: a2+b >TH(a2−b), wherein 'a2+b' represents an approximation of the estimate of the first eigenvalue, 'a2−b' represents an approximation of the estimate of the second eigenvalue, and 'TH' represents the threshold value; and
    wherein the apparatus is further caused to:
        determine the number of available spatially parallel communication streams to be two, if the test function is false; and
        determine the number of available spatially parallel communication streams to be one, if the test function is true.

13. The apparatus of claim 12, wherein 'a' comprises a sum of squared magnitudes of each element of the channel matrix, when the channel matrix is a two-by-two matrix, and 'b' comprises the discriminant of the second-degree characteristic equation of the two-by-two channel matrix representation.

14. The apparatus of claim 8, wherein the apparatus is further caused to:
- determine the number of available spatially parallel communication streams between the transmission antenna array and the reception antenna array as an average for a determined number of parallel frequency resource blocks; and
- cause the determined number of available spatially parallel communication streams to be transmitted to the radio transmitter.

15. The apparatus of claim 8, wherein the apparatus is further configured to operate as a part of a mobile station of a mobile telecommunication system.

16. An apparatus, comprising:
- calculating means for calculating a two-by-two channel matrix representation representing properties of a radio channel between a transmission antenna array of a radio transmitter and a reception antenna array of a radio receiver;
- examining means for examining mutual proportions of a first eigenvalue and a second eigenvalue of the channel matrix representation with a test function including elements of a solution of roots of a quadratic characteristic equation of the two-by-two channel matrix representation, wherein the test function comprises a discriminant of the solution of the roots of the quadratic characteristic equation without a square root operation; and
- determining means for determining the number of available spatially parallel communication streams between the transmission antenna array and the reception antenna array from the mutual proportions of the eigenvalues.

17. The apparatus of claim 16, further comprising:
- forming means for forming the two-by-two channel matrix representation from a channel response matrix, the channel response matrix describing response of the radio channel between each transmit antenna and each reception antenna, by multiplying the channel response matrix with a complex conjugate transpose of the channel response matrix appropriately, if the channel response matrix has a non-equal number of rows and columns and if either the number of rows or number of columns of the channel response matrix is two.

18. The apparatus of claim 16, further comprising:
- examining means for examining the ratio of the first eigenvalue to the second eigenvalue of the channel matrix representation with the test function by comparing an estimate of the first eigenvalue with an estimate of the second eigenvalue multiplied by a predetermined threshold value; and
- determining means for determining the number of available spatially parallel communication streams from a result of the comparison.

19. A non-transitory computer readable medium having a computer program embodied thereon, the computer program being configured to control a processor to perform:
- calculating a two-by-two channel matrix representation representing properties of a radio channel between a transmission antenna array of a radio transmitter and a reception antenna array of a radio receiver;
- examining mutual proportions of a first eigenvalue and a second eigenvalue of the channel matrix representation with a test function including elements of a solution of roots of a quadratic characteristic equation of the two-by-two channel matrix representation, wherein the test function comprises a discriminant of the solution of the roots of the quadratic characteristic equation without a square root operation; and
- determining the number of available spatially parallel communication streams between the transmission antenna array and reception antenna array from the mutual proportions of the eigenvalues.

20. The medium of claim 19, wherein the computer program is further configured to cause a processor to perform:
- forming, if a channel response matrix describing response of the radio channel between each transmit antenna and each reception antenna has a non-equal number of rows and columns, wherein either the number of rows or the number of columns is two, the two-by-two channel matrix representation from the channel response matrix by multiplying the channel response matrix with a complex conjugate transpose of the channel response matrix appropriately.

21. The medium of claim 19, wherein the computer program is further configured to cause a processor to perform:
- examining the ratio of the first eigenvalue to the second eigenvalue of the channel matrix representation with the test function by comparing an estimate of the first eigenvalue with an estimate of the second eigenvalue multiplied by a predetermined threshold value; and
- determining the number of available spatially parallel communication streams from the result of the comparison.

* * * * *